US012605234B2

(12) United States Patent
Kaylakov

(10) Patent No.: US 12,605,234 B2
(45) Date of Patent: Apr. 21, 2026

(54) SURGICAL INCISION DEVICE FOR DENTAL IMPLANT PLACEMENT

(71) Applicant: Boris Kaylakov, Rego Park, NY (US)

(72) Inventor: Boris Kaylakov, Rego Park, NY (US)

( * ) Notice: Subject to any disclaimer, the term of this patent is extended or adjusted under 35 U.S.C. 154(b) by 437 days.

(21) Appl. No.: 17/965,194

(22) Filed: Oct. 13, 2022

(65) Prior Publication Data

US 2023/0149133 A1     May 18, 2023

Related U.S. Application Data

(60) Provisional application No. 63/280,619, filed on Nov. 18, 2021.

(51) Int. Cl.
*A61C 8/00* (2006.01)
(52) U.S. Cl.
CPC ................................... *A61C 8/0089* (2013.01)
(58) Field of Classification Search
CPC ............ A61C 3/00; A61C 8/0089; B26B 3/04
See application file for complete search history.

(56) References Cited

U.S. PATENT DOCUMENTS

| | | | | |
|---|---|---|---|---|
| 4,924,575 A | * | 5/1990 | James ..................... | A47J 43/28 |
| | | | | 30/315 |
| 2011/0250563 A1 | * | 10/2011 | Horvath ................... | A61C 5/88 |
| | | | | 433/149 |
| 2012/0311874 A1 | * | 12/2012 | Rhoads ................... | A47J 43/20 |
| | | | | 30/279.2 |
| 2016/0324061 A1 | * | 11/2016 | Luckett ................. | A01B 1/246 |

* cited by examiner

*Primary Examiner* — Erin Mcgrath
(74) *Attorney, Agent, or Firm* — Sam Pierce

(57) ABSTRACT

A surgical incision device for dental implant placement is provided. The device comprises of two parallel blades, one perpendicular blade, skateboard-like surface and two finger rests. Said two parallel blades are half-elliptical in shape and parallel to each other. Said third blade is half round in shape and perpendicular to other two blades. All three blades are attached to a single skateboard like surface. Said two finger rests positioned opposite to each other on skateboard like surface with one designed for index finger and the other for thumb. The device is capable of producing a double papilla sparing incision. The device further comprises of two-wheel like blades, center of rotation and protective cap.

10 Claims, 6 Drawing Sheets

SURGICAL INCISION DEVICE FOR DENTAL IMPLANT PLACEMENT

CROSS REFERENCE TO RELATED APPLICATIONS

The present non-provisional patent application is related to U.S. Provisional Patent Application No. 63/280,619 filed Nov. 18, 2021, the contents of which are incorporated herein in their entirety.

FIELD OF THE DISCLOSURE

The present disclosure relates to novel surgical incision device for dental implant placement on partially edentulous patients. More particularly, the invention relates to a placement device that is capable of incision of various sizes along curved and straight surfaces found on patients' intraoral gingival tissues.

BACKGROUND

Implantalogy has been a fast-growing field of interest for many patients, general dentists, periodontists and oral surgeons. This method may include application of specific blade device along desired gingival edentulous areas between two teeth.

Traditional blade device is known as scalpel need a strong, steady and precise hand to apply and incise gingiva to the crest of bone. The development of tissue punch biopsies of various sizes has been adapted to take the place of scalpel (blade #15) in order to uncover implants at the time of healing abutment placement.

Some dental specialists use a punch biopsy in order to place implants. However, that method does not reveal visibility of actual bone width in order to make more predictable and successful implant placement. Therefore, most dental practitioners today rely on a more conventional incision techniques using #15 blade to expose enough bone in order to place implant in a more precise position i.e., surrounded by bone.

15 Blade is a typical device for the above-mentioned conventional technique. However, #15 Blade use or other scalpel also requires a long procedural time, a skilled hand and more patient's blood loss in order to ensure a uniform precise incision. Therefore, both punch biopsy device and #15 Blade scalpel have many drawbacks.

Punch biopsy has most important drawback for implant placement-lack of precise implant placement due to lack of bone visibility. Lack of bone visibility will possibly lead to implant failure, especially in hands of a novice implantalogist. On the other hand, conventional scalpel incision has many drawbacks; a long procedural time, more patient's blood loss, skilled surgical hand, more patient anxiety (patient seeing blade), difficult manual incision, but more predictable for implant survival due to visibility of bone.

Therefore, a need exists in the field for novel incision placement device capable of eliminating most drawbacks existing in two above-mentioned devices.

SUMMARY

The present disclosure comprises a novel incision device generally consisting of 3 blades in one tool adjustable for depth and height of edentulous area between two teeth, which is capable of conforming to gingival contours performing incision, specifically double papillae sparing incision. Double papillae sparing incision is advantageous over other types of incision due to prevention of gingival recession, thus giving more esthetic results.

Also, another advantage is for second stage of implant surgery where mobilization of tissues may be required. Esthetic results are especially important when a front tooth is missing. Therefore, double papillae sparing incision is advantageous over many incision types. This novel device will have various prefabricated widths similar to punch biopsy device that come in various diameters or widths.

In prototype A, two half-elliptical blades are parallel to each other. In center of device on its cutting surface half rounded blade is perpendicular to both half-ellipses. All 3 blades are secured well on rectangular foundation resembling a skateboard. Skateboard surface having two finger rests for both index finger and thumb opposite to each other.

In prototype B, two wheel-like blades parallel to each other and perpendicular to the center of rotation of device when viewed from cutting surfaces up. Two parallel wheels capable of rotation around their common axis. Surface on the opposite side to blades has a "cap" or cover protecting patient and operator from unwanted or iatrogenic injuries.

"Cap" or cover also acts as finger rests for index finger and thumb besides preventing iatrogenic injuries. In prototype C, one quarter-round blade secured well on skateboard-like surface. Skateboard surface has two finger rests for thumb and index finger.

DETAILED DESCRIPTION

The present disclosure is to be considered as an exemplification of the invention and is not intended to limit the invention to the specific embodiments illustrated by the figures or description below.

Figure 1:
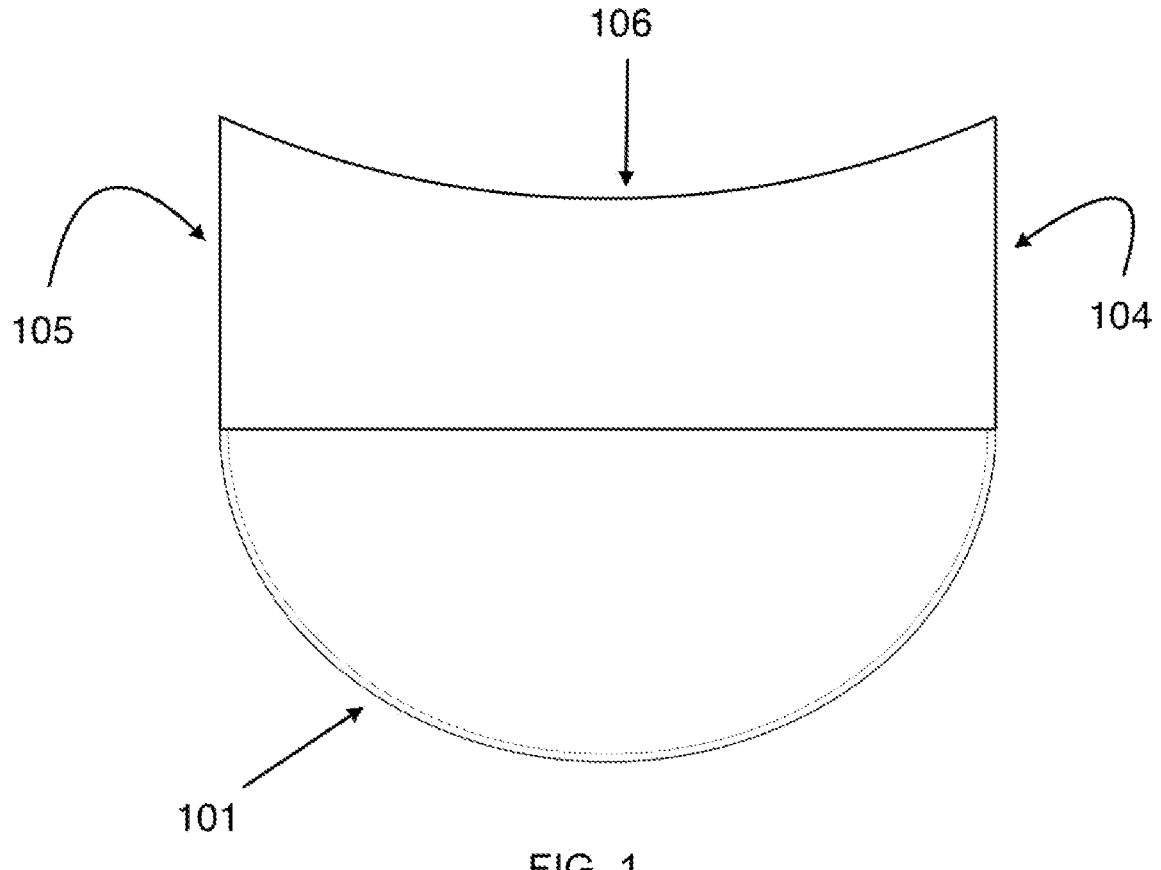
FIG. 1 is a diagram of a novel surgical incision device for dental implant placement according to an embodiment of the present disclosure.
Figure 2:
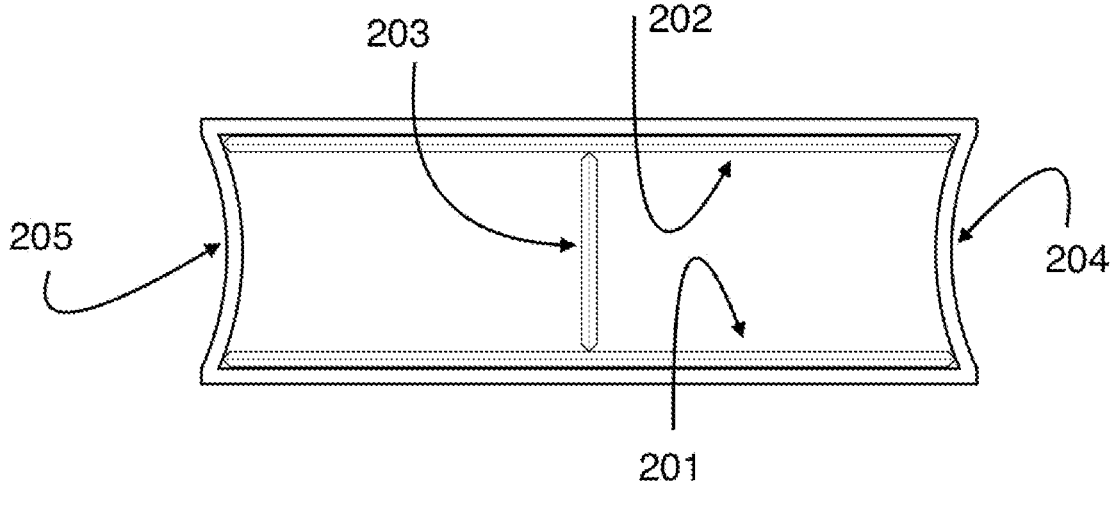
FIG. 2 is a diagram of a novel surgical incision device for dental implant placement according to an embodiment of the present disclosure.
Figure 3:
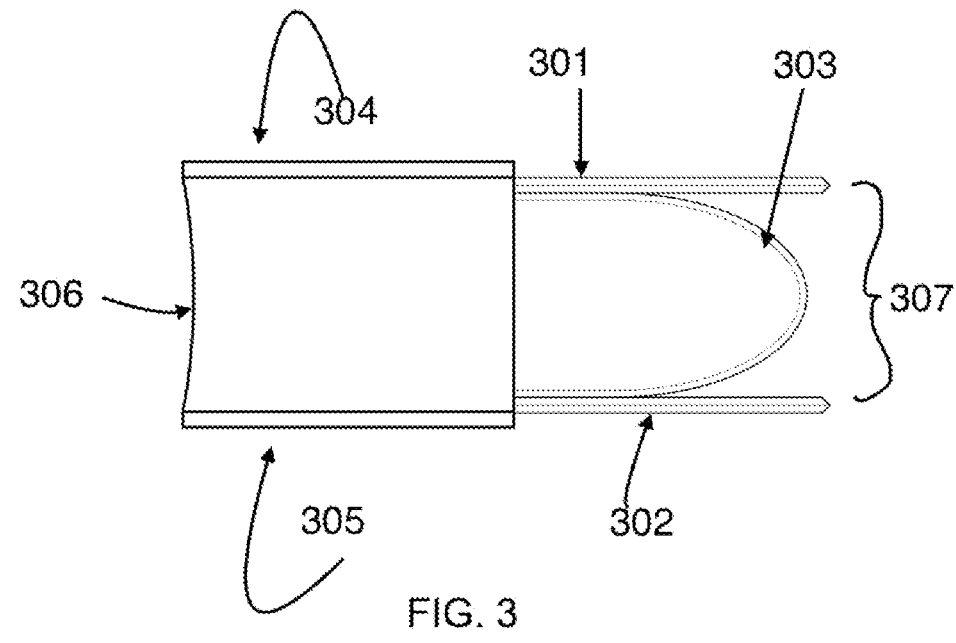
FIG. 3 is a diagram of a novel surgical incision device for dental implant placement according to an embodiment of the present disclosure.

The present invention will be described by referring figures. FIGS. 1, 2 and 3 depict exploded views of the elements that comprise device for double papillae sparing incision in prototype A.

FIG. 1 depicts exploded parts of prototype A with blades facing down. 101 is half elliptical blade. 104 is thumb rest. 105 is index finger rest. 106 is concave surface, resembling skateboard.

FIG. 2 depicts exploded illustration of view of prototype A with blades facing up. Blades 201 and 202 are parallel to each other. 203 is perpendicular to both 201 and 202. 204 is thumb rest and 205 index finger rest.

FIG. 3 depicts exploded illustration of side view of prototype A with blades pointed to the right side. Blades 301 and 302 parallel to each other. Blade 303 is half round blade perpendicular to 301 and 302. 304 and 305 represent finger rests with slight concavities in form of typical thumb and index fingers, respectively for improved grip and safety. 306 is concave surface. 307 is distance between blades 301 and 302. 307 will come in various standard widths similar to present day punch biopsy devices (like 6, 7, 8, 9.10 mm).

To determine correct size 307 for a specific missing tooth need to measure distance between two teeth intraorally. Thus, for illustrative purposes "G" is distance between two teeth. To ensure preservation of both papillae "G" has to be at least slightly longer than 307. Then after determining 307 from measuring "G", try device between two teeth to make sure the fit is correct.

Try slightly rolling device without placing pressure by securely holding at rests to buccal side to see whether vertical incisions do not undermine both papillae. To make incision apply apical pressure while holding at rests with both thumb and index finger with significant pressure until feel crestal bone between teeth. Afterwards, apply light rolling motion to the buccal side while applying pressure on top of bone. Roll until reaching desired length for vertical incisions.

Figure 4:
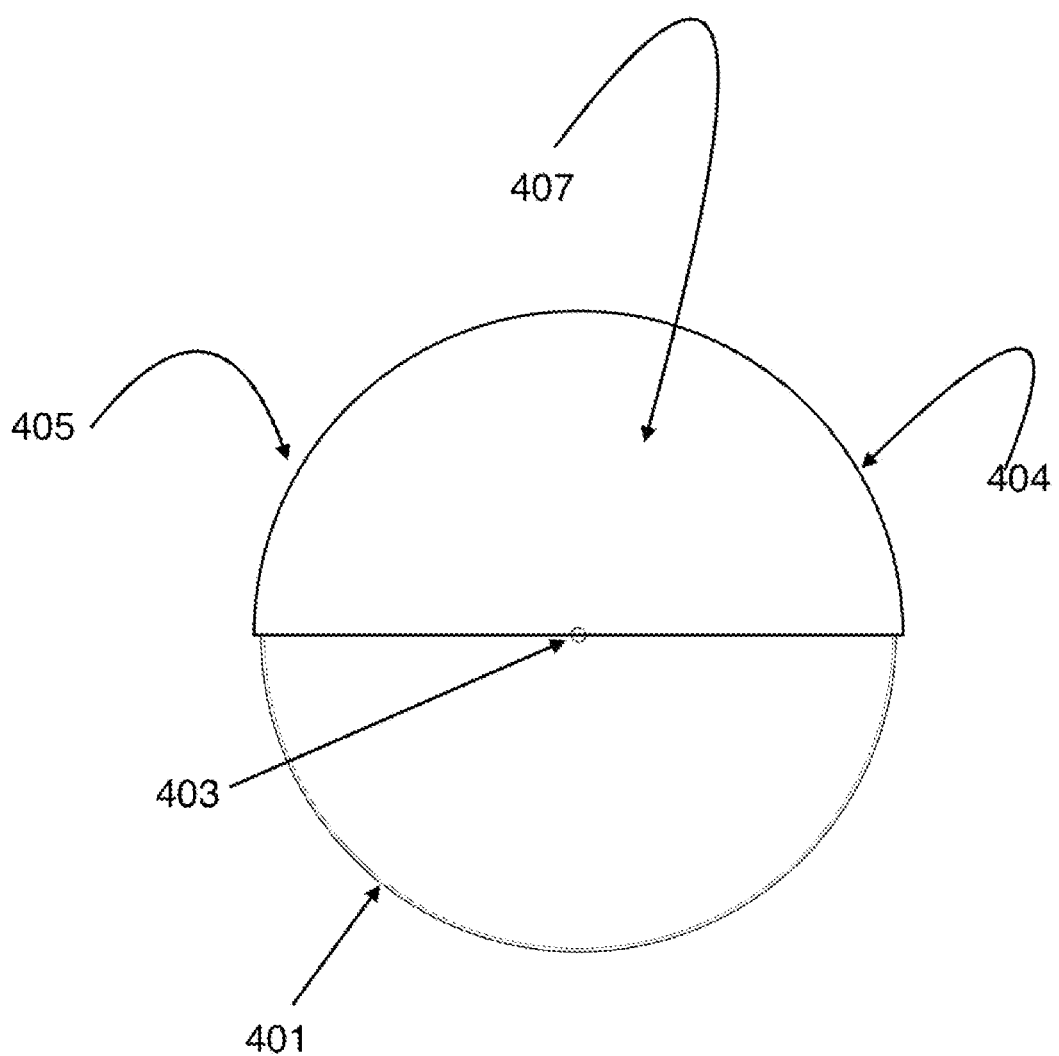
FIG. 4 is a diagram of a novel surgical incision device for dental implant placement according to an embodiment of the present disclosure.
Figure 5:
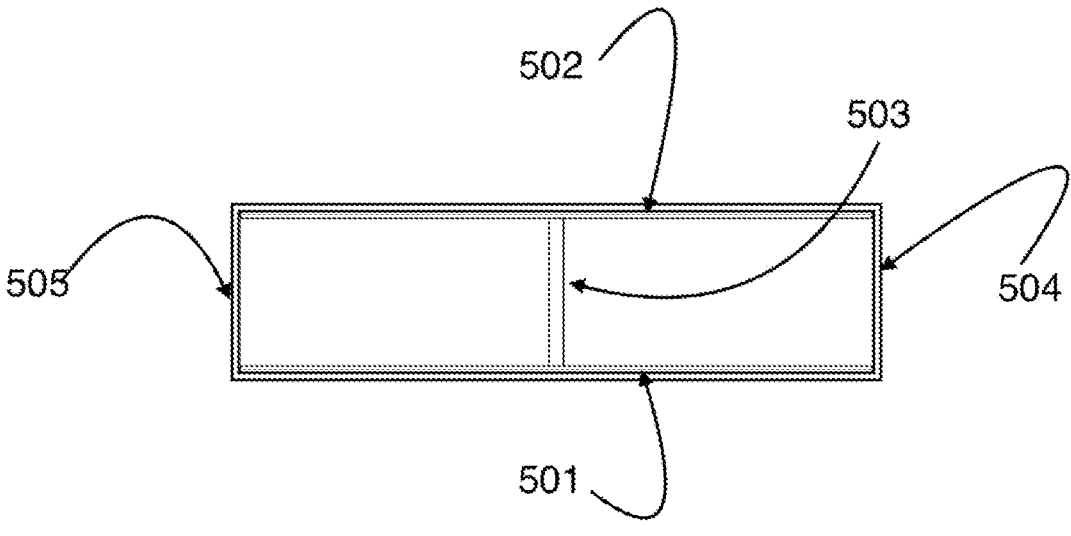
FIG. 5 is a diagram of a novel surgical incision device for dental implant placement according to an embodiment of the present disclosure.
Figure 6:
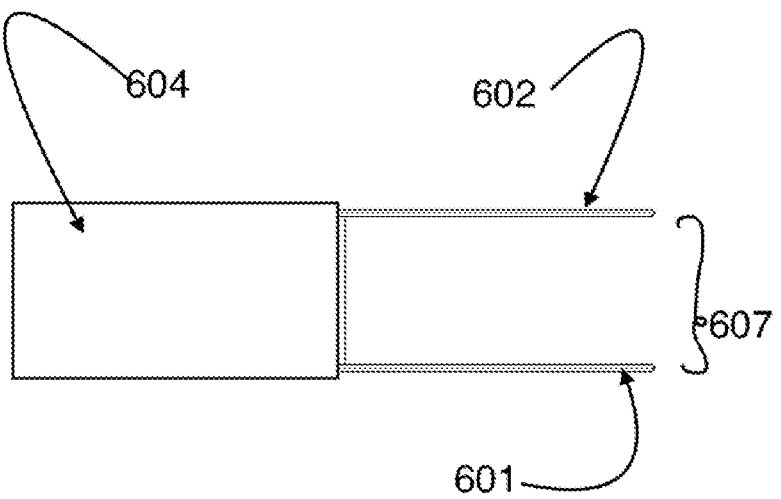
FIG. 6 is a diagram of a novel surgical incision device for dental implant placement according to an embodiment of the present disclosure.

Please refer to FIGS. 4, 5 and 6 for parts in Prototype B. FIG. 4 depicts exploded view of Prototype B with blades facing down. 401 is full round blade parallel to the other blade (not shown due to view) capable of rotary motion around their common axis, 403. 403 is center of rotation for both blades 401 and 402. 404 is thumb rest, 405 is index finger rest. 407 is a protective cap, to protect from unwanted injuries and to hold the device.

FIG. 5 depicts an exploded view of Prototype B with blades facing up. Round blades 501 and 502 are parallel to each other. 503 is center of rotation. 504 is thumb rest and 505 is index finger rest.

FIG. 6 depicts exploded side views of Prototype B with blades pointed to the right side. Round blades 601 and 602 are parallel to each other. 604 is thumb rest and 607 is distance between blades 601 and 601.

Main differences between Prototypes I and II are as follows. Two parallel blades are half-elliptical and stationary in Prototype A. Two parallel blades are circular and revolving in Prototype B.

Cover or "cap" in Prototype B protects both patient and operator and also acts as finger rests. Instructions on use for Prototype B are similar as above-mentioned use for Prototype A. However, since crestal incision is missing in Prototype B, need #15 Blade to do crestal incision after performing incision with Prototype B.

Prototype A PROS vs #15 Blade.
More ergonomic design
Easier incision
Less procedural time
Less blood loss
Less patient anxiety (patient does not see blade or scalpel)
Prototype B PROS Vs #15 Blade are as Follows:
More ergonomic design Easier incision
Less procedural time
Less blood loss (because of less procedural time)
Less patient anxiety (no blade or scalpel visible to patient)
Less effort (Newton's third law)
Prototype A and B CONS
May need adjustment with #15 Blade. Just like #15 blade is used to adjust the cut if tissue is still attached after initial incision.
Prototype B always need #15 Blade to make crestal incision.
Prototype A and Prototype B may not work ideally if have severe bone loss and/or irregular bone anatomy.

Figure 7:
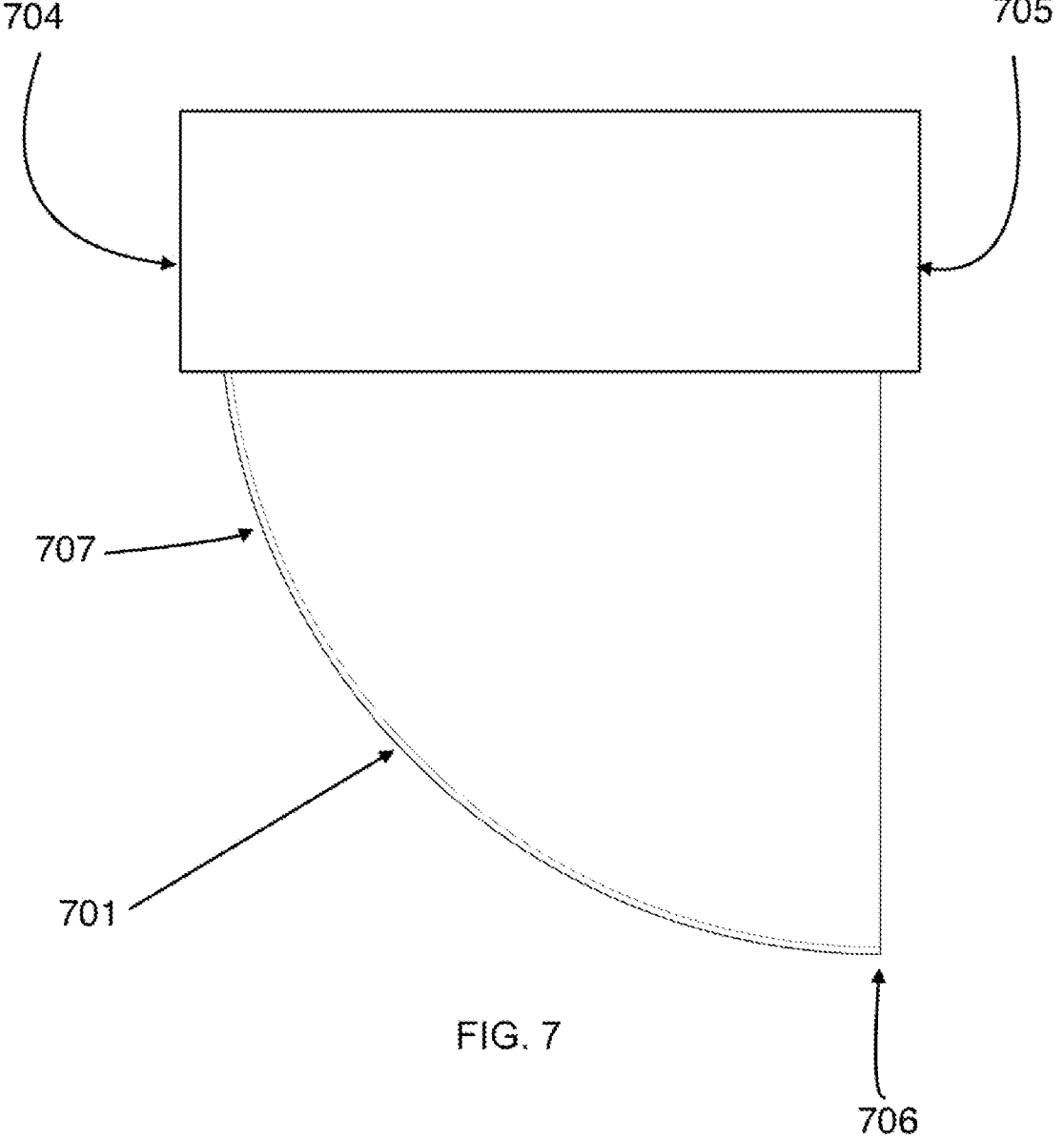
FIG. 7 is a diagram of a novel surgical incision device for dental implant placement according to an embodiment of the present disclosure.
Figure 8:
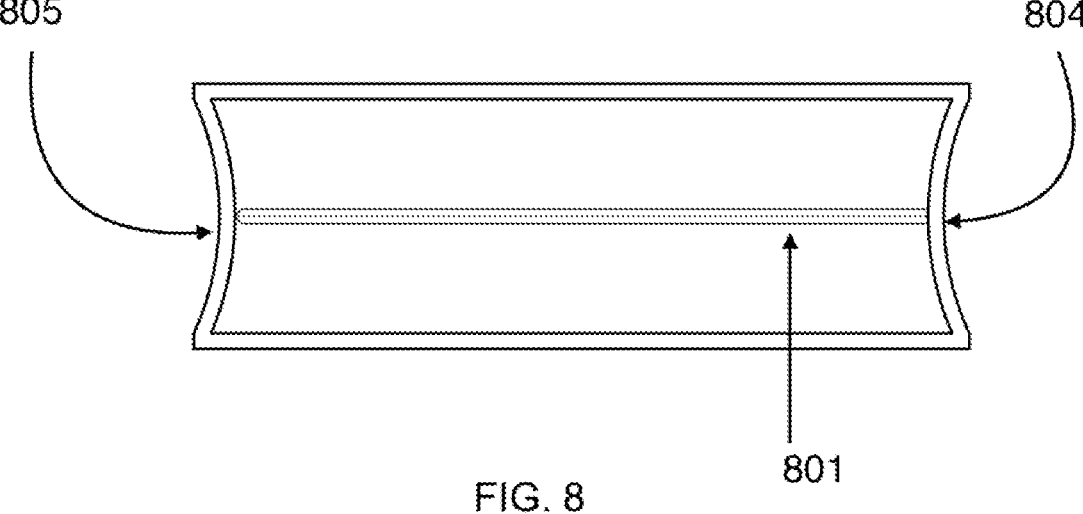
FIG. 8 is a diagram of a novel surgical incision device for dental implant placement according to an embodiment of the present disclosure.
Figure 9:
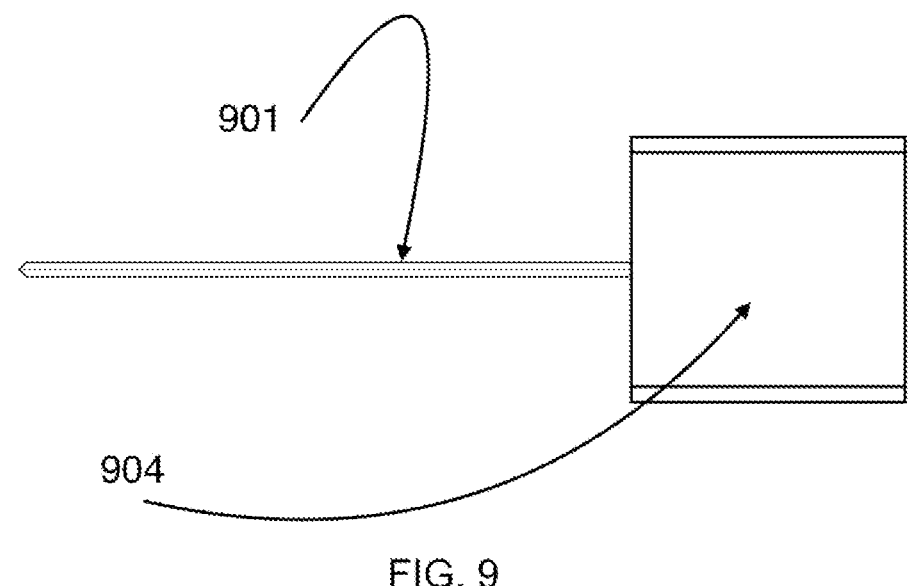
FIG. 9 is a diagram of a novel surgical incision device for dental implant placement according to an embodiment of the present disclosure.

The present disclosure is described by referring figures. FIG. 7, FIG. 8 and FIG. 9 depict exploded views of the elements that comprise device for crestal and vertical incisions in Prototype C. FIG. 7 depicts view of Prototype C with blade facing down. Component 701 is quarter-round blade. Component 704 is thumb rest. Component 705 is index finger rest. Component 706 is incision start point. Component 707 is incision end point.

FIG. 8 depicts view of Prototype C with blade facing up. Component 801 is quarter-round blade. Component 804 is thumb rest. Component 805 is index finger rest.

FIG. 9 depicts side view of Prototype C with blade pointed to the left side. Component 901 is quarter-round blade. Component 904 is thumb rest. To make incision, place index finger on index finger rest and thumb on thumb rest. With significant apical pressure start incision with 90-degree angle at blade point 706 until feel crest of bone. Then, firmly but slowly roll till reaching desired length of incision, or maximum length to point, 707. Prototype C can be used in crestal as well as vertical incisions.

Prototype C PROS vs #15 Blade
More ergonomic design
Easier incision
Less procedural time
Less blood loss
More clear cut (single continuous cut instead of increments by #15 blade)
Faster longer incision (then incremental incision by #15 blade)
More accurate cut (single continuous cut instead of increments by #15 blade)

These Prototypes A, B, and C very similar to punch biopsy devices in terms of simple use and multiple prefabricated sizes. However, these prototypes are more accurate then punch biopsy devices, because bone visibility is possible. These devices may become valuable due to multiple factors. Their simple use and design may just make them very popular for general dentists, periodontists and oral surgeons.

What is claimed is:
1. A surgical incision device for dental implant placement, comprising:
a foundation having two oppositely positioned finger rests, a first finger rest configured for an index finger and a second finger rest configured for a thumb; a first blade and a second blade, each having a half-elliptical profile, the first and second blades fixedly mounted on the foundation in a parallel arrangement; a third blade having a semi-circular profile, the third blade fixedly mounted on the foundation and oriented perpendicular to the first and second blades; wherein parallel planes of the first blade and second blade are spaced apart between 6 mm and 10 mm; and wherein the surfaces of the device are flat in the plane of the blades and clear of any protrusions.

2. The device of claim 1, wherein the first, second, and third blades are disposed on the same side of the foundation.

3. The device of claim 1, wherein the third blade is positioned intermediate the first and second blades.

4. The device of claim 1, wherein the third blade is positioned entirely between the first and second blades.

5. The device of claim 1, wherein the third blade is equidistant from the first and second blades.

6. The device of claim 1, wherein the foundation includes a concave thumb rest formed on a first lateral side thereof.

7. The device of claim 1, wherein the foundation includes a concave finger rest formed on a second lateral side thereof.

8. The device of claim 1, wherein an upper side of the foundation is concave.

9. The device of claim 1, wherein the third blade extends laterally across the foundation.

10. The device of claim 1, wherein distal ends of the first, second, and third blades terminate at an equal distance from the foundation to facilitate the production of the double papilla sparing incision.

\* \* \* \* \*